United States Patent
Lamanna

(10) Patent No.: US 11,051,376 B2
(45) Date of Patent: Jun. 29, 2021

(54) LIGHTING METHOD AND SYSTEM TO IMPROVE THE PERSPECTIVE COLOUR PERCEPTION OF AN IMAGE OBSERVED BY A USER

(71) Applicant: Salvatore Lamanna, Catanzaro (IT)

(72) Inventor: Salvatore Lamanna, Catanzaro (IT)

( * ) Notice: Subject to any disclaimer, the term of this patent is extended or adjusted under 35 U.S.C. 154(b) by 0 days.

(21) Appl. No.: 16/634,882

(22) PCT Filed: Aug. 17, 2018

(86) PCT No.: PCT/IT2018/050157
§ 371 (c)(1),
(2) Date: Jan. 29, 2020

(87) PCT Pub. No.: WO2019/049184
PCT Pub. Date: Mar. 14, 2019

(65) Prior Publication Data
US 2020/0214102 A1 Jul. 2, 2020

(30) Foreign Application Priority Data
Sep. 5, 2017 (IT) .......................... 102017000099120

(51) Int. Cl.
*H05B 45/22* (2020.01)
*H05B 47/155* (2020.01)
(Continued)

(52) U.S. Cl.
CPC .......... *H05B 45/22* (2020.01); *H04N 5/2352* (2013.01); *H04N 9/646* (2013.01); *H05B 47/155* (2020.01)

(58) Field of Classification Search
CPC .......... G09G 2340/04; G09G 2340/06; G09G 2340/14; H04N 9/31; H04N 9/3111; H04N 9/312
See application file for complete search history.

(56) References Cited

U.S. PATENT DOCUMENTS

| 5,548,346 A | * | 8/1996 | Mimura | ................. H04N 5/147 348/14.1 |
| 6,040,860 A | * | 3/2000 | Tamura | ..................... H04N 5/20 348/252 |

(Continued)

FOREIGN PATENT DOCUMENTS

| WO | WO 99/53728 | 10/1999 |
| WO | WO 2006/003600 | 1/2006 |
| WO | WO 2019/049184 | 3/2019 |

OTHER PUBLICATIONS

International Search Report and the Written Opinion dated Nov. 8, 2018 From the International Searching Authority Re. Application No. PCT/EP2016/058813 and Its Translation of Search Report Into English (12 Pages).

*Primary Examiner* — Amy Cohen Johnson
*Assistant Examiner* — James H Cho

(57) ABSTRACT

A lighting method for illuminating an environment by means of a plurality of light sources is comprised of the following steps: acquiring a video signal, in which an image of each frame is divided into a plurality of boxes; subdividing the video signal into a plurality of video signal boxes, each associated with an image portion of each frame displayed on a respective box; processing frequency of the frame video signals, for obtaining spectra of respective luminance and chrominance signals associated with each video signal box; extracting a dominant frequency band of the luminance signal spectrum associated with each box video signal; extracting a dominant frequency band of the chrominance signal spectrum associated with each box video signal; summing the processed spectra of luminance and chrominance signals; and obtaining a time driving signal of each of the light sources.

23 Claims, 8 Drawing Sheets

(51) Int. Cl.
*H04N 5/235* (2006.01)
*H04N 9/64* (2006.01)

(56) References Cited

U.S. PATENT DOCUMENTS

| | | | | |
|---|---|---|---|---|
| 7,932,953 B2 * | 4/2011 | Gutta | ........................ | H04N 9/73 348/602 |
| 8,063,992 B2 * | 11/2011 | Gutta | ........................ | H04N 9/73 348/603 |
| 8,127,995 B2 * | 3/2012 | Chiang | ................. | G03B 21/008 235/472.02 |
| 8,640,954 B2 * | 2/2014 | Chiang | ................... | H04N 9/315 235/454 |
| 9,058,765 B1 * | 6/2015 | Mallick | ............... | G06Q 30/0601 |
| 9,483,982 B1 * | 11/2016 | Reddy | ....................... | H04N 5/57 |
| 10,534,973 B2 * | 1/2020 | Keene | ................... | G06K 9/4652 |
| 10,594,902 B2 * | 3/2020 | Higashi | ................ | H04N 1/6005 |
| 10,772,177 B2 * | 9/2020 | Mason | .................. | G06F 3/04847 |
| 2005/0184952 A1 * | 8/2005 | Konno | .................. | G09G 3/3648 345/102 |
| 2005/0196049 A1 * | 9/2005 | Clark | ................... | H04N 19/136 382/232 |
| 2005/0206788 A1 * | 9/2005 | Eves | .................... | H05B 47/175 348/602 |
| 2007/0126864 A1 * | 6/2007 | Bhat | .................. | H04N 21/4318 348/51 |
| 2007/0183678 A1 * | 8/2007 | Sankar | ................. | G09G 3/3406 382/254 |
| 2007/0242162 A1 * | 10/2007 | Gutta | ........................ | H04N 9/73 348/645 |
| 2008/0094515 A1 * | 4/2008 | Gutta | .................... | H05B 47/155 348/602 |
| 2009/0123086 A1 * | 5/2009 | Iwanami | ................... | H04N 9/73 382/274 |
| 2009/0256962 A1 * | 10/2009 | Iwanami | ............ | H04N 21/4348 348/552 |
| 2009/0263043 A1 * | 10/2009 | Cristobal Perez | ........ | G06T 5/50 382/275 |
| 2011/0190911 A1 * | 8/2011 | Iwanami | ............ | H04N 21/8133 700/90 |
| 2012/0133899 A1 * | 5/2012 | Chiang | ................. | G03B 21/204 353/31 |
| 2013/0163666 A1 * | 6/2013 | Leontaris | ............. | H04N 19/186 375/240.12 |
| 2013/0194395 A1 * | 8/2013 | Hannuksela | ......... | H04N 13/128 348/51 |
| 2016/0080712 A1 * | 3/2016 | Daly | ....................... | G09G 5/10 345/597 |
| 2017/0161882 A1 * | 6/2017 | Mantiuk | ................ | A61B 3/024 |
| 2017/0347427 A1 * | 11/2017 | Cole | ................... | H04N 21/4131 |
| 2020/0014835 A1 * | 1/2020 | Uemura | ............. | G01N 21/8806 |

* cited by examiner

LIGHTING METHOD AND SYSTEM TO IMPROVE THE PERSPECTIVE COLOUR PERCEPTION OF AN IMAGE OBSERVED BY A USER

RELATED APPLICATIONS

This application is a National Phase of PCT Patent Application No. PCT/IT2018/050157 having International filing date of Aug. 17, 2018, which claims the benefit of priority of Italian Patent Application No. 102017000099120 filed on Sep. 5, 2017. The contents of the above applications are all incorporated by reference as if fully set forth herein in their entirety.

FIELD AND BACKGROUND OF THE INVENTION

This invention regards a lighting method and system for improving the perspective colour perception of an image observed by a user.

The invention relates to a method and system of the above type, designed and manufactured to illuminate an environment so as to enhance the chromatic perception of images observed by a user in the environment itself according to the video signal, which may be used for any device or equipment for which video signal processing is required.

The description below will focus on a method and ambient lighting system to improve the surrounding colour perception of an image reproduced on a display, such as a plasma or LED TV, projector, smartphone, tablet, cinema screen and similar, though it is evident that it should not be considered as limited to this specific use.

Recent years have seen the progressive development of ambient lighting systems that can improve the visual experience of a user.

Various technical solutions are being developed that allow the processing of information regarding the brightness of an image reproduced by a display, or the colour of a certain area of the image observed by the user, in order to drive light sources installed in such display.

The relevant prior art comprises US patent application US 2012/262072 A1 and international patent application WO 2008/110973 A1.

The solution described in US 2012/262072 A1 is a method suitable for providing an ambient lighting effect in a cinema, comprising a cinema screen or display in general, positioned on a wall, and multiple light sources.

The solution described in this patent application allows an analysis of the sequence of images or videos that will be shown on the screen, determining a dominant colour associated with the image content or a dominant object within that image.

The solution described in WO 2008/110973 A1 refers to a method for controlling the brightness of an environment based on the static or dynamic image projected onto a projection surface.

In further detail, this method allows the illumination of the space around a projection surface, such as that of a TV, on the basis of the image projected on such surface or TV.

However, drawbacks are found in the technical solutions described in aforementioned patent applications as well as other known solutions.

A first drawback of these existing solutions consists in the fact that they do not always take the peripheral vision of the user into account.

An additional drawback of such known solutions consists in the fact that they simply reproduce ambient lighting that is equal to that produced near the centre of vision of the user.

Another disadvantage of the solutions in prior art is that for very complex images with considerable chromatic variations, the projected lighting tends to not reproduce the colours in a faithful manner, often displaying a white or nearly white light effect, which does not correspond to the image shown in the display.

SUMMARY OF THE INVENTION

The aim of this invention is to overcome the drawbacks mentioned by the solutions proposed in the prior art, providing a lighting system that is able to improve chromatic illumination and the relative chromatic perception associated with an image observed by a user, such as on a screen.

Another aim of the invention is to provide a lighting system that is able to enhance the chromatic information associated with the image observed by the user.

Another aim of the invention is to offer a lighting system that involves the peripheral vision of the eye of the user, in consideration of the response times of the same.

Another aim of the invention is to provide a lighting system that improves the visual impact of the user, providing greater centrality to the scene observed by the latter.

Another aim of the invention is to provide a lighting system capable of producing a variable chromatic perspective, determined by the processing of a video signal.

Another aim of the invention is to provide a lighting system equipped with independent light sources that interact with the scene observed by the user.

Another aim of the invention is to provide a lighting system capable of reproducing a "surround" experience of colours, or of distributing colours around a user.

Another aim of the invention is to provide a lighting system that is highly reliable, relatively simple to manufacture and at a competitive cost when compared to the prior art.

These and other results are obtained with a lighting system according to the invention for a screen of any type, comprising luminous columns, each of them provided with a certain number of lighting units, the value of which varies according to the size of the screen, resolution, and the desired light intensity, and a control unit characterised by the fact that the light columns are at least two pairs placed at the sides of the screen. The control unit comprises: a data acquisition unit, capable of acquiring a video signal and converting it in an appropriate manner; a data processing unit which, on the basis of the data acquired by the data acquisition unit, the number of pairs of luminous columns, the number of lighting units of each column and the desired perspective effect, processes the colour of each individual lighting unit of each luminous column; a number of control units equal to the number of luminous columns, which transmit the appropriate commands to the luminous columns, at the same time supplying them with the power required.

The results indicated are also obtained due to the fact that the lighting system provides that the control unit of the device operates on the pixels acquired by the data acquisition unit, that the pixels are divided into macro columns starting from the outer edge up to the centre, that the width of the columns (i.e. the number of pixels used) depends on the desired perspective effect and can be variable between one macro column and another. Each column is divided into identical numbers of areas, equal to the number of lighting units present on the luminous columns. The control unit for each macro area processes either the average of colours of each pixel in the macro area, the predominant colour of the macro area, or a mix of the two data.

The results according to the invention are also obtained with a lighting system in which the perspective effect is obtained by sending, the colour data relating to the macro column closest to the edge of the image to the light column farthest from the edge of the screen and so forth, until the last luminous column is reached.

The system according to the invention also allows a perspective effect to be obtained by entering a time delay between one light column and the next, starting from that closest to the screen.

The perspective effect of the system is obtained by using the macro column closest to the edge as the main column; the control unit implements an initial processing of the colour data of each macro area and associates this data with the light column closest to the screen.

For each subsequent column, the control unit reduces the number of macro areas used for data processing, thus creating a fade effect between the columns closest to the screen and those furthest away.

In addition, the lighting system provides a perspective effect obtained by using the macro column closest to the edge as the main column; the control unit implements an initial processing of the colour data of each macro area and associates this data with the light column closest to the screen. For each subsequent column, the control unit changes the colour tone gradually amongst the columns closest to the screen and those furthest away.

A specific aim of this invention is therefore a lighting method for illuminating an environment by means of a plurality of light sources, with i=1, . . . , N, where N is a positive integer and j=1, . . . , M, where M is a positive integer, wherein the method is comprised of the following steps: A. acquisition of a video signal v(t), in which the image of each frame is divided into a plurality of boxes; B. subdivision of the video signal v(t) into a plurality of video signal boxes $v_{ij}(t)$, each associated with the image portion of each frame displayed on a respective box; C. frequency processing of the frame video signals $v_{ij}(t)$, for obtaining the spectra of the respective luminance $\tilde{Y}_{ij}(f)$ and chrominance signals $\tilde{C}_{ij}(f)$ associated with each box video signal $v_{ij}(t)$; D. extraction of the dominant frequency band of the luminance signal spectrum $\tilde{Y}_{ij}(f)$ associated with each box video signal $v_{ij}(t)$; E. extraction of the dominant frequency band of the chrominance signal spectrum $\tilde{C}_{ij}(f)$ associated with each box video signal $v_{ij}(t)$; F. sum of the processed spectra of luminance and chrominance signals; and G. obtaining the time driving signal $p_{ij}^{Ctrl}(t)$ of each of the light sources.

According to the invention, in phase B, all of the rows of each image frame for each box can be divided, so as to obtain a plurality of video signals $v_{ij}(t)$ associated with the boxes of the image.

According to the invention, phase C can be comprised of the following sub-phases: C1. frequency transformation of the box video signal $v_{ij}(t)$ relative to each box; and C2. frequency filtering of the box video signal $\hat{V}_{ij}(f)$, so as to obtain the spectrum of the luminance signal $\tilde{Y}_{ij}(f)$ and chrominance signal $\tilde{C}_{ij}(f)$ associated with each box.

According to the invention, phase D can advantageously comprise the following sub-phases: D1. frequency detection of the maximum instantaneous frequency $f_{ij}^{Max-Y}$ associated with the maximum value $Y_{ij}^{Max}$ of the spectrum of each luminance signal $\hat{Y}_{ij}(f)$ associated with each box; and D2. filtering of the luminance signal spectrum $\hat{Y}_{ij}(f)$ around the frequency $f_{ij}^{Max-Y}$, obtaining a filtered luminance spectrum $\overline{Y_{ij}^{filt}}(f)$ associated with each box.

According to the invention, in phase D2 a band-pass filtering can be performed around the instantaneous maximum frequency $f_{ij}^{Max-Y}$ for a predetermined bandwidth $\Delta_b^Y$, obtaining a spectrum of the filtered luminance signal $\overline{Y_{ij}^{filt}}(f)$.

Preferably according to the invention, phase E can be comprised of the following sub-phases: E1. frequency detection of the maximum instantaneous frequency $f_{ij}^{Max-C}$ associated with the maximum value $C_{ij}^{Max}$ of the spectrum of each chrominance signal $\tilde{C}_{ij}(f)$ associated with each box; and E2. filtering of the chrominance signal spectrum $\tilde{C}_{ij}(f)$ around the frequency $f_{ij}^{Max-C}$, obtaining a filtered chrominance spectrum $\overline{c_{ij}^{filt}}(f)$ associated with each box.

According to the invention, in phase E2 a band-pass filtering can be performed around the instantaneous maximum frequency $f_{ij}^{Max-C}$ for a predetermined bandwidth $\Delta_b^C$, obtaining a spectrum of the filtered chrominance signal $\overline{c_{ij}^{filt}}(f)$.

According to the invention, phase F may comprise the step of adding the filtered spectra of luminance $\overline{Y_{ij}^{filt}}(f)$ and chrominance signals $\overline{c_{ij}^{filt}}(f)$.

Advantageously, according to the invention, in phase G the time driving signal $p_{ij}^{Ctrl}(t)$ of each of the light sources can be obtained by means of an inverse Fourier transform of the sum of the filtered spectra of the luminance $\overline{Y_{ij}^{filt}}(f)$ and chrominance signals $\overline{c_{ij}^{filt}}(f)$.

According to the invention, video signal v(t) can be of the type intended to be represented on a display, such as a television, smartphone, tablet, projector, and similar.

Preferably according to the invention, these light sources can be installed in a plurality of lighting units, with i=1, . . . , N, where N is a positive integer, wherein the lighting units are arranged in the environment (A).

According to the invention, each lighting unit may comprise a subset of one or more light sources.

According to the invention, the light sources of the subset of one or more light sources of each lighting unit can each correspond to a respective subset of boxes of the image of each frame, such that each of the boxes of the subset of boxes is adjacent to at least one other box of the same subset.

According to the invention, the sub-set of boxes may be a column of panels in which the boxes are arranged vertically, and the sub-set of light sources of each lighting unit can be arranged vertically.

Additionally, according to the invention, the columns of boxes are shaped according to one of the following configurations: the columns of boxes are all the same, but have a gradually decreasing width for the columns of boxes corresponding to the centre of the image with respect to those arranged towards the sides of the image, the columns of boxes being of symmetrical dimensions with respect to the vertical axis which divides the image passing through the centre thereof; the columns of boxes have a different height and a different width, in which both the height and the width of the columns of boxes gradually decrease for the columns of boxes corresponding in the centre of the image with respect to those arranged towards the edges of the image, the columns of boxes being of symmetrical dimensions with respect to the vertical and horizontal axes which vertically and horizontally divide the image passing for the centre of the same; the columns of boxes all have the same width, but a decreasing height for the columns of boxes corresponding to the centre of the image with respect to those arranged towards the taller and shorter sides of the image, the columns of boxes being of symmetrical dimensions with respect to the horizontal axis which divides the image passing through the centre thereof.

Preferably according to the invention, the method can drive the light sources of each lighting unit with time delays with respect to others.

According to the invention, in the case in which the environment features walls, the light sources can be arranged facing the walls of the environment.

Another specific aim of this invention is a computer program comprising instructions which, when the program is executed by a computer, cause the processor to perform the method phases as described above.

A specific aim of this invention is also a readable storage medium comprising instructions which, when executed by a computer, cause the processor to execute the method phases as described above.

Another aim of this invention is a lighting system for illuminating an environment, based on a video signal v(t), comprising a plurality of lighting units, with i=1, . . . , N, where N is a positive integer, wherein the lighting units are arranged in the environment, wherein each of the lighting units comprises a plurality of light sources, with j=1, . . . , M, with M positive integer number, and a control logic unit, to which the video signal source can be connected for the acquisition of the video signal v(t), wherein the control logic unit is operatively connected to the lighting units, such that the control logic unit can independently drive each of the light sources, and wherein the control logic unit is configured to perform the method phases as described above.

According to the invention, the control logic unit can comprise a signal acquisition unit, for the acquisition of the video signal v(t), a signal processing unit for processing the video signal v(t) acquired, so as to obtain the time driving signals $p_{ij}^{Ctrl}(t)$ of each of the light sources, and a plurality of driving units, with i=1, . . . , N, each configured to drive the light sources of a respective lighting unit associated with it on the basis of the driving signals of each light source.

According to the invention, the light sources can comprise multicolour LEDs.

Advantageously according to the invention, the control logic unit can be connected to the lighting units by wires and/or wirelessly, such as by means of Bluetooth®, infrared and similar.

According to the invention, the system can comprise a positioning device, such as an ultrasonic signal laser pointer, configured to allow the arrangement of lighting units within the environment according to a predefined perspective with respect both to the point of view of a user and with respect to the video signal source.

BRIEF DESCRIPTION OF THE SEVERAL VIEWS OF THE DRAWINGS

The invention is now described, by way of example and without limiting the scope of the invention, with reference to the accompanying drawings which illustrate preferred embodiments of it, in which.

Similar parts will be indicated in the various drawings with the same numerical references.

DESCRIPTION OF SPECIFIC EMBODIMENTS OF THE INVENTION

Figure 1:
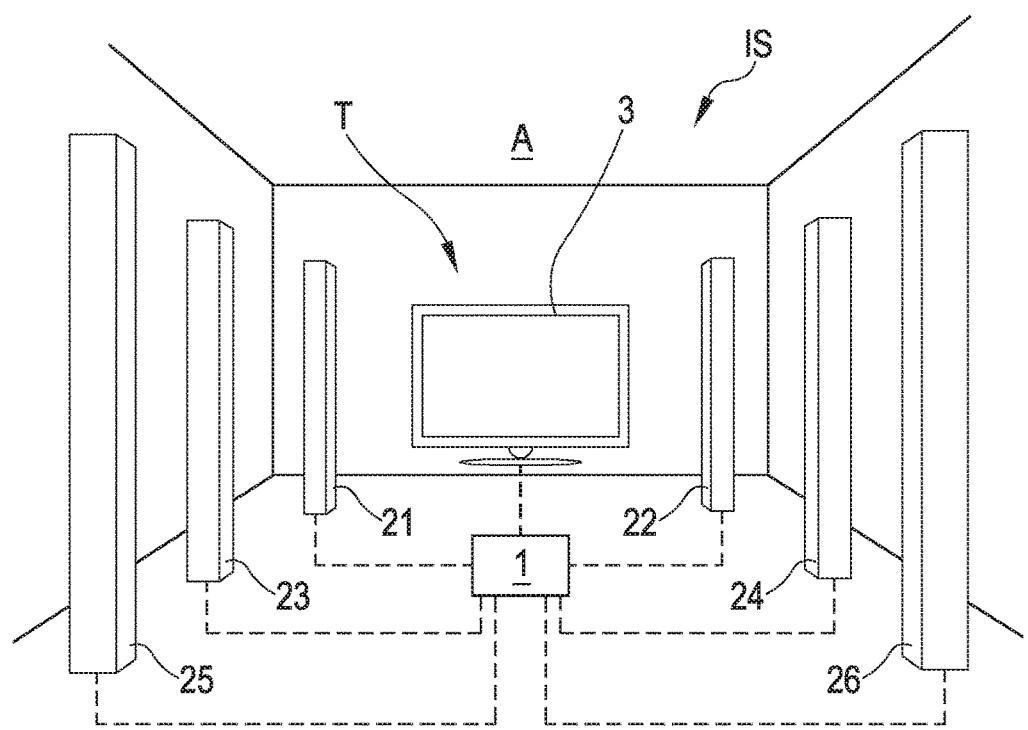
FIG. 1 shows an embodiment of the lighting system, according to this invention.

As is well known, a composite video signal is typically made up of three main elements:

luminance signal;

chrominance signal; and synchronism signal.

The luminance signal is a component of the video signal that provides information related to the brightness levels of the individual points that comprise the image on the screen. The luminance signal carries information about the white and black colours of the image.

More in detail, this component of the video signal requires a high bandwidth (typically up to 5 MHz) for the transmission of crisp and clear (black and white) images.

The chrominance signal, on the other hand, includes information on the colour of the image. This signal consists of two quadrature components that modulate a carrier (at 3.58 MHz for NTSC signals ("National Television Standards Committee") and at 4.43 MHz for PAL signals ("Phase Alteration Line").

Colour information uses less bandwidth than the band occupied by the luminance signal, ranging from 0.6 MHz to 1.3 MHz.

The synchronisation information needed to control the electronic scanning of the video signal on the display screen comprises a horizontal sync signal and a vertical sync signal.

The horizontal sync signal indicates the end-of-line condition, while the vertical sync signal is placed temporally between a field or "frame", i.e. the set of lines in which the image is divided, and the next.

Based on the above, the luminance signal and synchronism signal make up the so-called monochromatic composite signal, also indicated by the letter "Y". The chrominance signal is represented with the letter "C".

As previously mentioned, this invention directly involves the peripheral vision of the user.

Peripheral vision is the part of one's vision that resides outside the centre of the eye. This vision forms the largest portion of our visual field. By way of example, a generic field of vision is equal to approximately 70°, of which approximately 100° are related to peripheral vision.

Peripheral vision is divided into the following areas of the field of vision:
"near peripheral" vision, between 8° and 30°;
"middle-peripheral" vision, between 30° and 60°; and
"distant peripheral" vision, between 60° and 100°/110°.

The boundary between near peripheral vision and middle-peripheral vision is based on different characteristics of the visual function. Visual acuity decreases by approximately 50% every 2.5° from the centre up to 30°, where it reduces more quickly.

However, peripheral vision is weak in human beings, especially as concerns the distinction of details and shapes.

This is due to the fact that the density of receptors and ganglion cells in the retina is much greater in the centre of the visual field with respect to its extremes. The representation of an image perceived by the human eye in the visual cortex is much lower in the peripheral part of the visus than in the corresponding part of the fovea.

The main functions of peripheral vision are as follows:
recognition of well-known structures and shapes without any need to focus with foveal vision;
identification of similar shape and movements (Gestalt psychology); and
release of sensations that form the background of detailed visual perception.

As is known, the term perspective refers to a representation of objects in space, so as to reach the effect of the third dimension on a two-dimensional surface.

In this invention, the perspective technique is used inversely, i.e. to represent the three dimensions of the space, starting from a two-dimensional surface, such as an image observed by a user.

In general, in the technique of perspective, the expression "point of view" is associated with the position of the observer, and the "horizon line" is an imaginary line that passes in front of the observer's eyes.

Moreover, the "vanishing point" is a point located on the horizon line where all of the vanishing lines converge, i.e. the lines that depart from the vanishing point, producing the effect of spatial depth.

The type of perspective used in the technical solution of this invention is the central perspective (also called a "single vanishing point").

This perspective is used when one side of the subject to be portrayed is parallel to the projection plane. It presupposes that the observed object is facing the observer. Under such conditions, all of the lines of perspective converge towards the central focal point located on the horizon line. The vanishing lines, depth lines, converge into a single vanishing point.

In this invention, the construction of this perspective structure is functional to delimiting a three-dimensional space, in which the vanishing lines, with respect to the vanishing point, e.g. the observed scene, and the horizon line constitute an outline to establish the exact position of the lighting unit.

The prospective system proposed herein does not reproduce the reality of the scene, but rather represents an augmented reality of it, that is, that which could potentially be perceived by the human mind through peripheral vision.

In one embodiment of this invention, the plurality of lighting units are arranged perpendicular to the vanishing lines. Such vanishing lines form with the vanishing point, corresponding to the observed scene, an angle comprised between 100°-0°, relative to the angular measure of the peripheral vision of the user.

As will be described in detail in the continuation of the description, this invention allows the reproduction of a visual experience using colour, so as to reproduce a chromatic perspective to the observed scene in the surrounding space, organised according to a perspective system.

In particular, the lighting system proposed herein uses the technique of chromatic and aerial perspectives.

The chromatic perspective, which is complementary to that aerial, is highlighted by applying rules and experience in chromatology.

The aerial perspective is the form of representation that searches for variations in light intensity and shades of tones in relation to the distances, the thickness of the interposed layer of air and the position of the light source.

These techniques complement the effect of depth of the field, which the geometric perspective alone cannot fully represent in a realistic and congruent manner with the characteristics of human vision.

DESCRIPTION OF THE PREFERRED EMBODIMENTS

With reference to FIG. 1, a lighting system according to this invention is observed, indicated as a whole with IS, comprising a control logic unit 1, connectable to a video signal source, which in this case is a T-display with a screen to represent images or frames 3 of the video signal. In the case in question, the T-display is a television.

The lighting system IS also comprises a plurality of lighting units $2_1, \ldots, 2_i$, with $i=1, \ldots, N$, where N is a positive integer, wherein the lighting units $2_1, \ldots, 2_i$ are arranged in an environment A, facing the walls, so as to illuminate them.

The video signal source can be of any type, such as a TV antenna (terrestrial or satellite), a pen drive, external hard disk, the Internet, a video camera and similar.

Among other things, for its operation, the IS lighting system, does not require a screen (TV cinema or similar), but only the video signal, but not necessarily, intended to be represented on a screen, and it will work regardless.

If a T-display provided with a screen is to be connected, a video signal multiplier may be provided for, such as a splitter or similar, to multiply the original video signal (the same that is input into the control logic unit 1).

Figure 2:
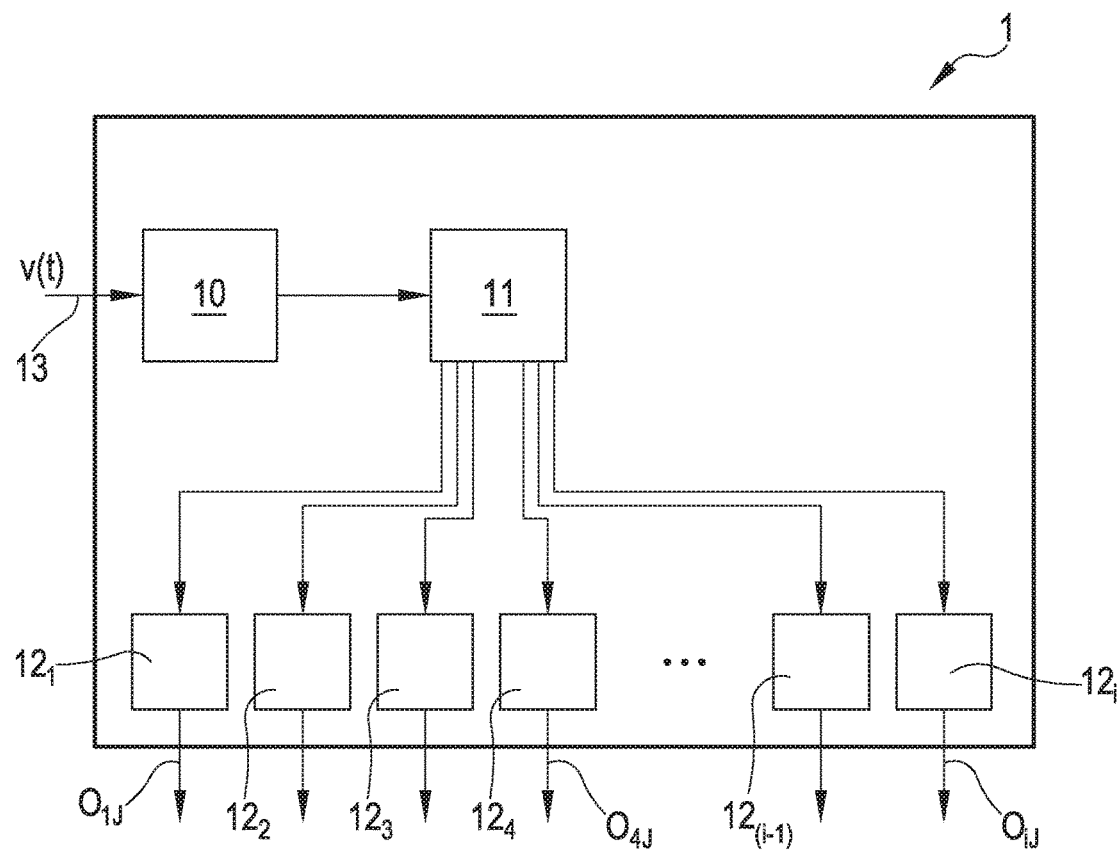
FIG. 2 is a block diagram of an embodiment of a master unit for controlling the lighting system, as seen in FIG. 1.
Figure 3:
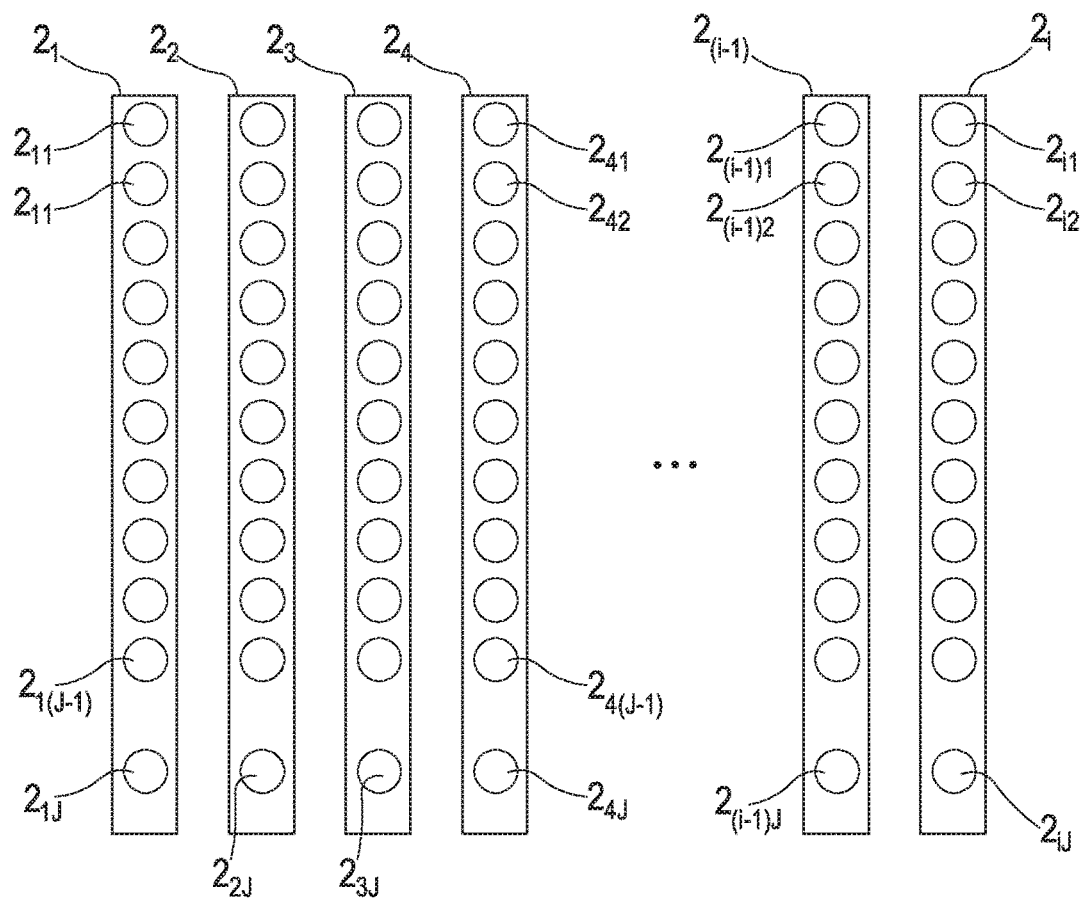
FIG. 3 schematically illustrates a plurality of lighting units of the lighting system, as seen in FIG. 1.

With reference to FIGS. 2 and 3, it is observed that each of the lighting units $2_i$ is operatively connected to the control logic unit 1.

Each lighting unit $2_i$ in turn comprises a plurality of light sources $2_{ij}$, with $j=1, \ldots, M$, with M being a positive integer number (the double subscript indicates the numbering of the light source j-th of the lighting unit 2i-th). More details on the light sources $2_{ij}$ will be provided in the following description.

The control logic unit 1 is configured to detect, process and transmit the video signal coming from the video signal source T.

As shown in FIG. 1, the control logic unit 1 comprises an entrance or input 13 for receiving a video signal v(t) from a source such as that shown in FIG. 1, which is a television T, but can be any different video signal source, a signal acquisition unit 10, connected to the input 13, a signal processing unit 11, connected to the signal acquisition unit 10, and a plurality of control or driving units $12_1, \ldots 12_i$, with $i=1, \ldots, N$.

Each control unit $12_i$ is associated with a respective lighting unit $2_i$.

More specifically, each control unit 12 includes a plurality of $O_{ij}$ outputs, with i=1, ..., N ej=1, ..., M, each relative to a respective light source $2_{ij}$.

In particular, each of the control units 12 is configured to control a respective i-th lighting unit $2_i$ by a number of connections j, each relating to a light source $2_{ij}$. The indices i and j respectively group or number the lighting units and light sources of each lighting unit.

The signal acquisition unit 10 is configured to acquire the video signal v(t) entering the control logic unit 1.

In particular, in one embodiment the signal acquisition unit 10 allows to separate or process the chrominance and luminance information associated with the incoming video signal v(t).

In an embodiment of this invention, the signal acquisition unit 10 comprises filtering means (not shown in the figures), which may comprise low-pass, high-pass, band-pass and/or notch filters, which allow for the extraction of the luminance and chrominance signal from an incoming video signal v(t).

Naturally, variants for the filtering operation of the luminance and chrominance signals according to the prior art are not excluded.

The signal processing unit 11 is configured to process the luminance signal and the chrominance signal, possibly independently, coming from the signal acquisition unit 10 in order to extract the information on the dominant colour of a given box (or area or portion) of each frame 3 of the incoming video signal v(t) potentially reproducible on the screen of a T display, as better described in the following.

Moreover, the signal processing unit 11 is further configured to send this information to the control units $12_1$, ..., $12_i$, each of which is associated with a respective lighting unit $2_i$.

Each control unit $12_i$ connected to the signal processing unit 11 receives the chromatic information from the signal processing unit 11 and drives a respective lighting unit $2_i$.

In particular, as mentioned earlier, each control unit $12_i$ is provided with a plurality of outputs $O_{ij}$ in order to independently drive each light source $2_{ij}$, which can be a multicolour LED, for example, of each lighting unit $2_i$.

More in detail, the connections between each of the control units 12 and the light sources $2_{ij}$ of each of the lighting units 2 may comprise serial or parallel connections, wireless connections, infrared, Bluetooth, and so on (not shown in the figures).

In one embodiment, each lighting unit 2 includes 72 RGB LEDs ("Red Green Blue"), each of which is operated by a constant current driver operable via the I2C protocol ("Inter Integrated Circuit").

By way of example, the control logic unit 1 of the lighting system IS of this invention can comprise the WS801 driver, provided with 3 output channels, each of which can supply a constant current up to 150 mA (such channels are directly connected to the LED, one channel for each colour).

The integrated circuit is operable by I2C protocol (each frame is transmitted with three sequences of 8-bit data, hence 24 bits for each frame).

As previously described, this invention comprises a plurality of lighting units $2_1$, ..., $2_i$, each of which interacts with the scene observed by the user in real time.

In particular, the time interval of this interaction extends from the impression of the image formed on the user's retina/fovea, at the moment of the actual perception of the same by the human eye.

The effect produced is the result of a process of acquisition, processing and transmission of the signal in visual data which typically occurs, by way of example, at the rate of one tenth of a second.

As an example, in approximately one-tenth of a second, the system is able to record at least all the colours twice in a virtual memory, transmitted successively to the individual lighting units $2_i$.

Figure 5:
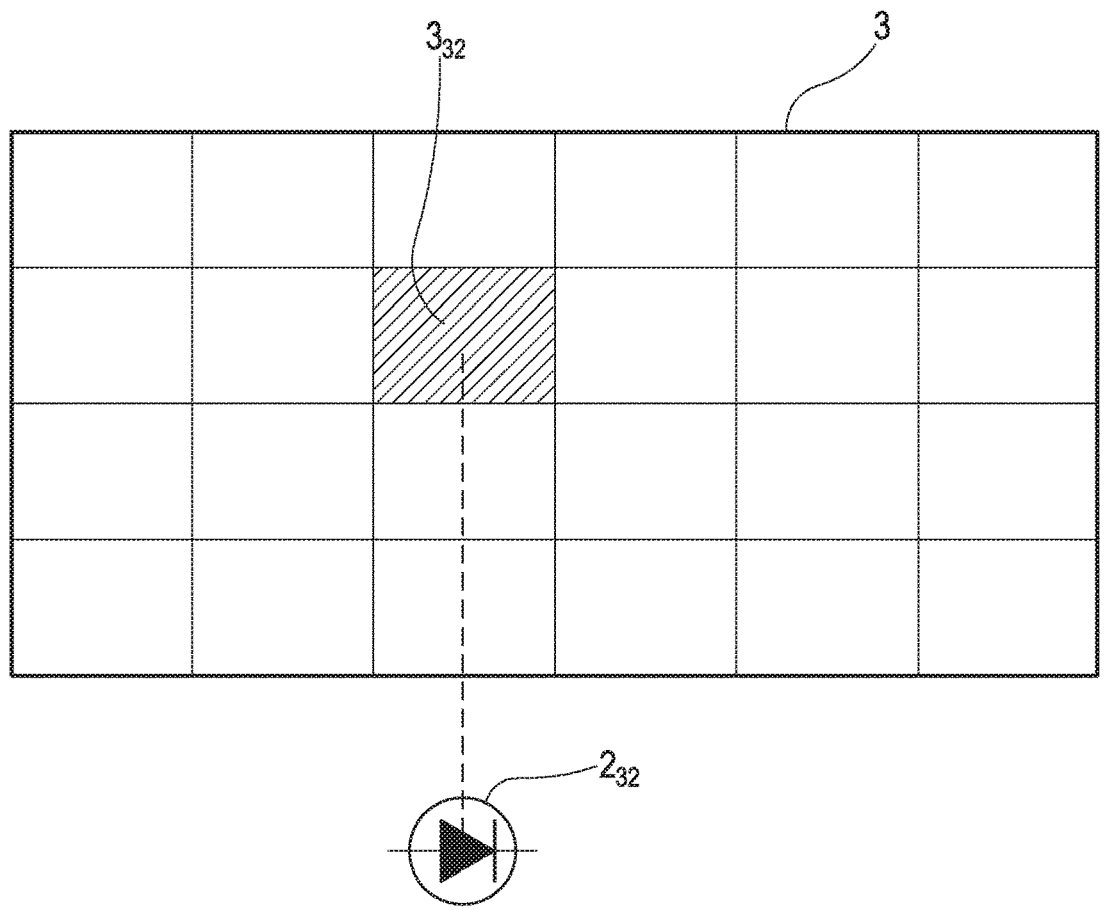
FIG. 5 schematically illustrates a division of the screen of the display into boxes, each associated to a respective light source, as seen in FIGS. 3 and 4.

With particular reference to FIG. 5, the control logic unit 1 allows to divide each frame 3 of the incoming video signal v(t) into portions corresponding to their respective boxes $3_{ij}$, the latter associated with pixel matrices on the screen of the T-display.

In the representation of FIG. 5, each frame 3 associated or composing the incoming video signal v(t) has been subdivided for simplicity, by way of example, into uniform boxes.

This control logic unit 1 divides the image of each frame 3, and therefore the incoming video signal, into rows of boxes and columns of frames v(t).

The image of each frame 3 is subdivided, therefore, into an N×M matrix of frames $3_{ij}$. Each box $3_{ij}$ will be represented in turn on the screen of a T display by multiple pixels.

Each box $3_{ij}$ is associated with a respective light source of the i-th lighting unit $2_i$.

More specifically, each control unit 12 drives each light source $2_{ij}$ of each lighting unit 2 on the basis of calculations performed on the box video signal $v_{ij}(t)$ relative to the respective box $3_{ij}$, extracting data such as intensity and dominant colour, as better explained below.

In the aforementioned FIG. 5, the association is shown between box $3_{32}$ and the respective light source $2_{32}$.

The intensity and the brightness of this colour are then reproduced in the environment by the light source $2_{ij}$, such as a multicolour LED, and projected, for example, on the walls of the environment A, so as to create a suitable chromatic effect.

In the figure (see also FIG. 6), the lighting units $2_i$ are vertical and provide for a plurality of light sources $2_{ij}$ arranged vertically, each corresponding to a box $3_{ij}$ of each column of boxes 3 of each image of each frame 3 of the video signal v(t).

the lighting unit 2 may be placed in housings (not shown in the figures) with an aesthetically appreciable aspect, so that it can also be an item of decor, with an open side, which is emitted from the illumination means of the light sources $2_{ij}$.

An embodiment of the method according to which the IS lighting system according to this invention processes the video signal v(t), takes place as follows.

Figure 11:
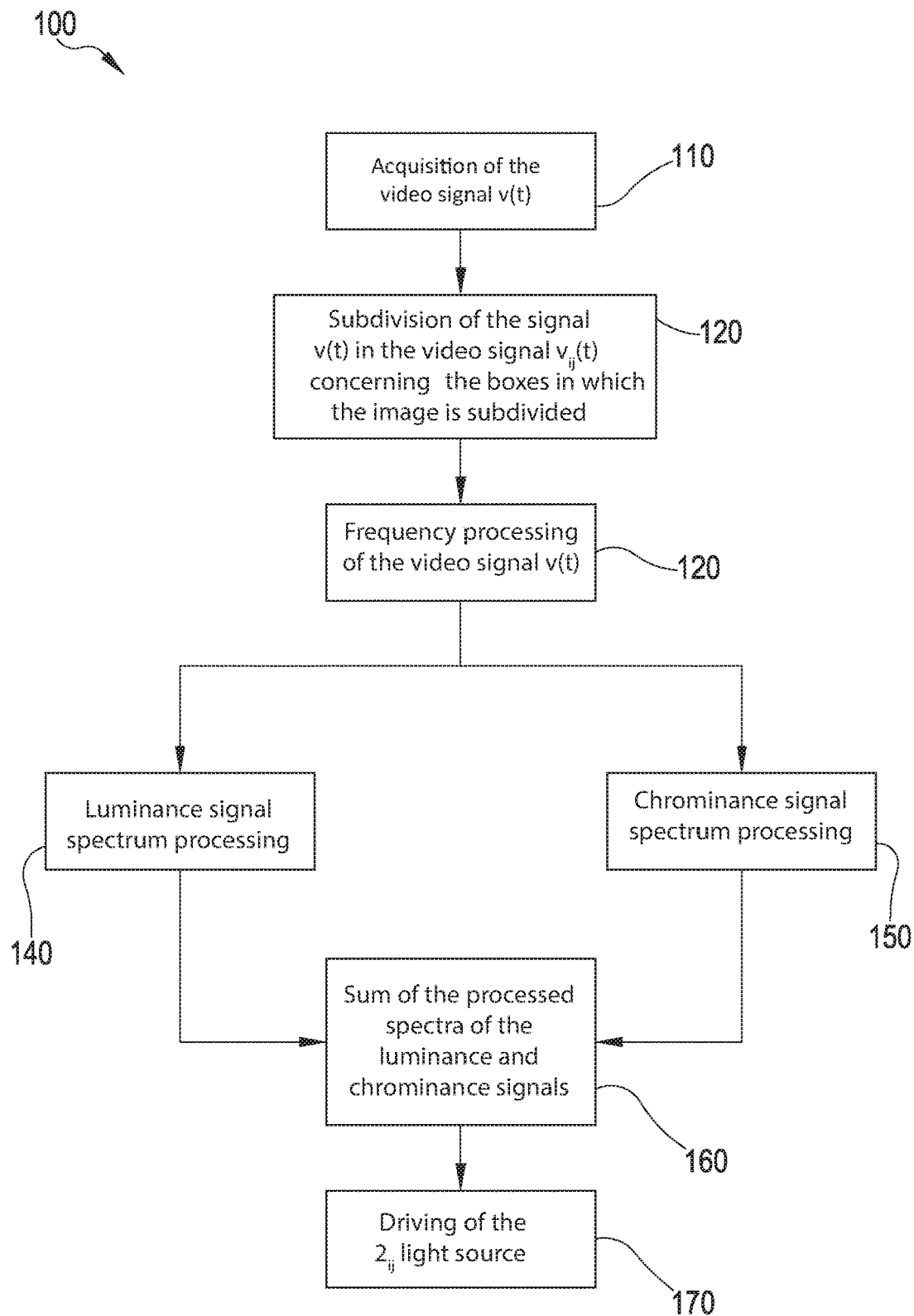
FIG. 11 is a flowchart showing an embodiment of the illumination method for improving the perspective perception of the colour of an image observed by a user, according to this invention.

In reference to FIG. 11, a flowchart 100 is seen that shows the general operating phases performed by the control logic unit 1.

In particular, following the acquisition of the video signal in the phase 110, in which the signal acquisition unit 10 receives the video signal v(t) from a signal source, the video signal v(t) it is then sent to the signal processing unit 11.

In the subdivision phase 120, the signal processing unit 11 detects the video signal relative to the boxes $3_{ij}$, in which the image of each box 3 of the video signal v(t) is divided upon entry.

More in detail, considering that the video signal is modulated by rows, in this phase, all of the rows of each frame are subdivided for each box $3_{ij}$, so as to obtain the video signal of the box $v_{ij}(t)$ over time, associated with each box.

Subsequently, the signal processing unit 11 performs a frequency filtering step 130, in which the luminance and chrominance signals are obtained, respectively $\tilde{Y}_{ij}(f)$ and $\tilde{C}_{ij}(f)$, associated with the time video signals of each box video signal $v_{ij}(t)$.

Lastly, the spectra of the luminance and chrominance signals of each box video signal $v_{ij}(t)$ are processed in two parallel phases of the spectrum of the luminance 140 and chrominance signals 150, to drive the light intensity and colour emitted of each of the light sources $2_{ij}$ of each lighting unit $2_i$.

The driving signal of the light source $2_{ij}$ is then sent to the light source so as to obtain the desired effect in real time.

Figure 12:
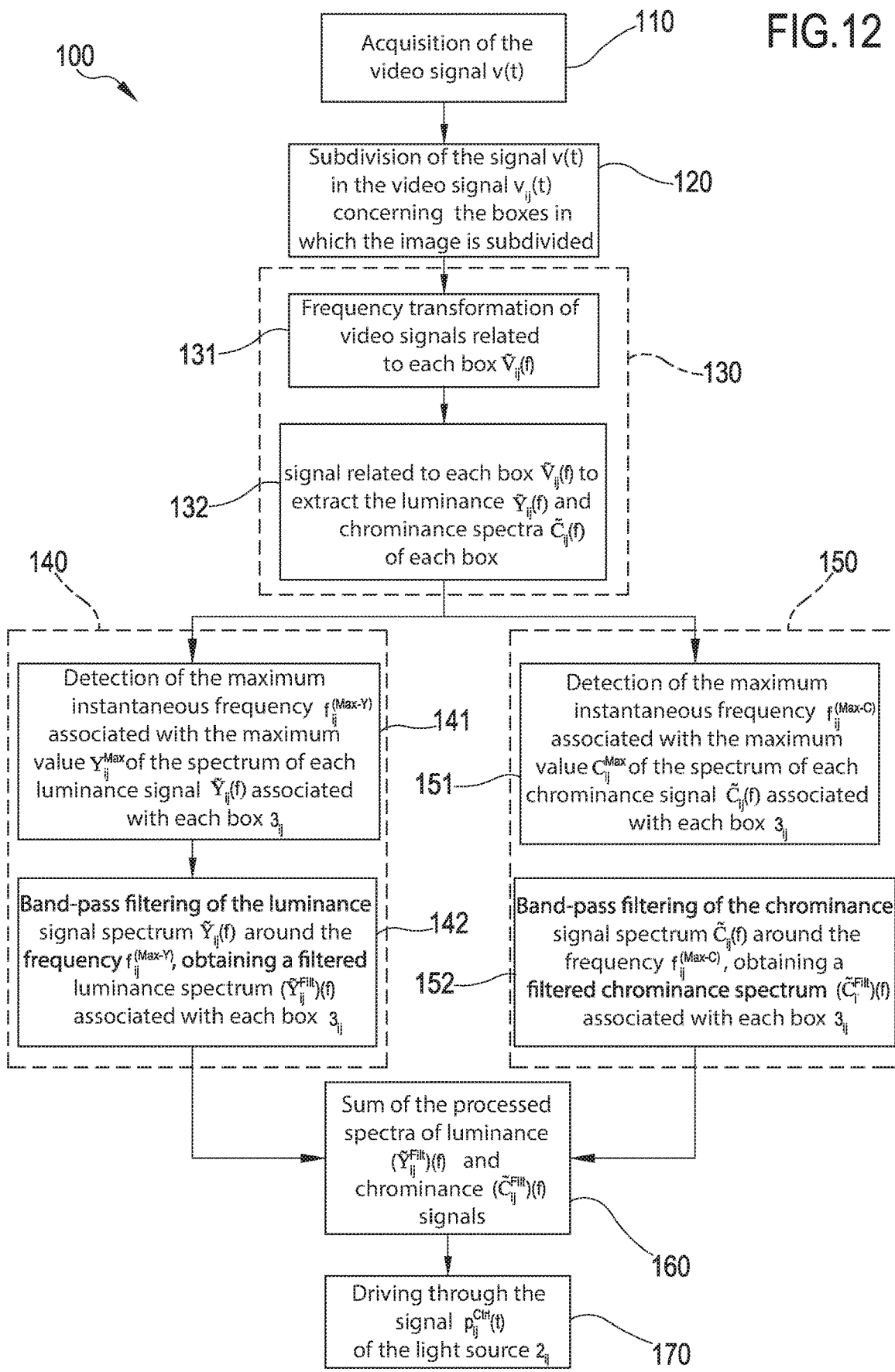
FIG. 12 is a flowchart illustrating an additional embodiment of the processing of the intensity and colour signal, as seen in FIG. 11.

In reference to FIG. 12, in one embodiment of the method, the frequency processing step 130 provides for the frequency transformation sub-phase 131 of the video signal of each box $v_{ij}(t)$ relating to each box $3_{ij}$ $$\tilde{V}_{ij}(f) = F\{v_{ij}(t)\}$$

indicating the known Fourier transform operation with $F\{\cdot\}$.

This operation can be performed in different ways according to procedures of prior art, such as DFT ("Discrete Fourier Transform"), FFT ("Fast Fourier Transform"), DCT ("Discrete Cosine Transform"), and so on.

Again by means of known frequency filtering operations 132, it is possible to obtain the aforementioned spectra of the luminance $\tilde{Y}_{ij}(f)$ and chrominance signal $\tilde{C}_{ij}(f)$ associated with each box $3_{ij}$ of the video signal.

In terms of the spectrum, the $$\tilde{V}(f) = \sum_{i,j} \tilde{V}_{ij}(f) = \sum_{i,j} \tilde{Y}_{ij}(f) + \tilde{C}_{ij}(f)$$

linearity properties of the Fourier transform exist.

Figure 6:
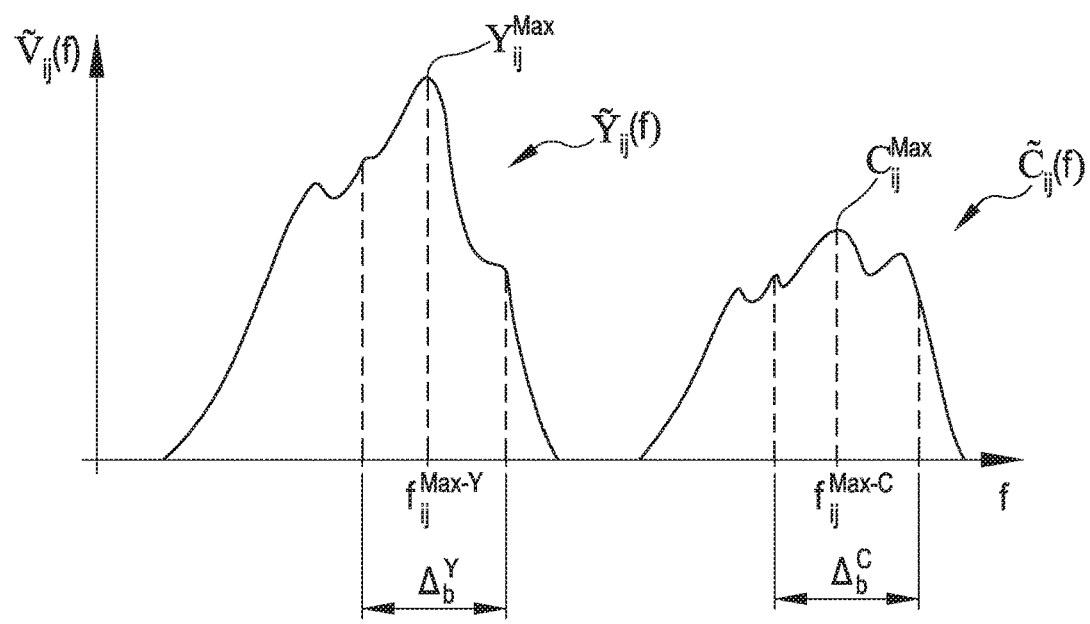
FIG. 6 shows the exemplary scheme of a frequency spectrum of a video signal.
Figure 7:
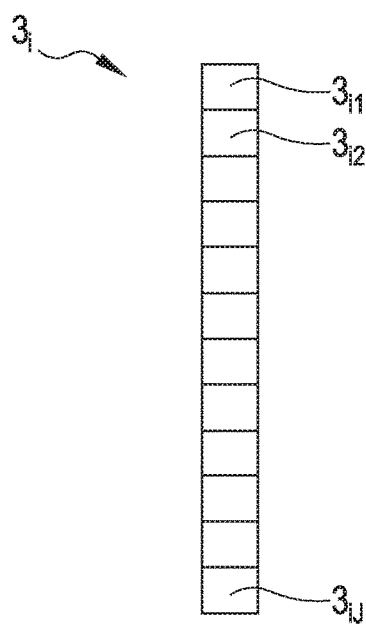
FIG. 7 shows a plurality of boxes associated with respective pixel matrices of the display screen for each column of panels, as seen in FIG. 4.

In reference to FIG. 6, for each box $3_{ij}$ of each frame 3, the phase of the luminance signal processing 140 includes an initial sub-phase 141 of the detection frequency value $f_{ij}^{Max-Y}$, which corresponds to the maximum $Y_{ij}^{Max}$ of the luminance signal spectrum $\tilde{Y}_{ij}(f)$ associated with each box $3_{ij}$.

Subsequently, in the band-pass filtering sub-phase 142 of the luminance signal spectrum $\tilde{Y}_{ij}(f)$ around the maximum frequency $f_{ij}^{Max-Y}$, obtaining a respective filtered spectrum $\overline{Y_{ij}^{Filt}}(f)$.

the filtering sub-phase 142 occurs around a predefined band $\Delta_b^Y$ around the maximum frequency $f_{ij}^{Max-Y}$.

The chrominance signal is processed analogously.

In particular, in reference to FIG. 6, for each box $3_{ij}$ of each frame 3, the phase of the chrominance signal processing 150 includes an initial sub-phase 151 of the detection frequency value $f_{ij}^{Max-C}$, which corresponds to the maximum $C_{ij}^{Max}$ of the chrominance signal spectrum $\tilde{C}_{ij}(f)$ associated with each box $3_{ij}$.

Subsequently, in the band-pass filtering sub-phase 152 of the chrominance signal spectrum $\tilde{C}_{ij}(f)$ around the maximum frequency $f_{ij}^{Max-C}$, obtaining a respective filtered spectrum $\overline{C_{ij}^{Filt}}(f)$.

the filtering sub-phase 152 occurs around a predefined band $\Delta_b^C$ around the maximum frequency $f_{ij}^{Max-C}$.

The two filtered luminance $\overline{Y_{ij}^{Filt}}(f)$ and chrominance spectra $\overline{C_{ij}^{Filt}}(f)$ are then added together. The time driving signal $p_{ij}^{Ctrl}(t)$ of each light source $2_{ij}$ of each lighting unit $2_i$ is obtained as an inverse Fourier transform of the sum of the aforesaid spectra, or $$p_{ij}^{Ctrl}(t) = F^{-1}\{\overline{Y_{ij}^{Filt}}(f) + \overline{C_{ij}^{Filt}}(f)\}$$

indicating $F^{-1}\{\cdot\}$ with the inverse Fourier transform.

In a further embodiment, after both the aforesaid band-pass filtering sub-phases of the luminance $\tilde{Y}_{ij}(f)$ and chrominance signal spectrum $\tilde{C}_{ij}(f)$, respectively indicated with 142 and 152, an average of the frequencies around the average can be made $Y_{ij}^{Max}$ and $C_{ij}^{Max}$, subsequently inverse transforming the quadratic spectra around the aforementioned maximum frequencies, $f_{ij}^{Max-Y}$ and $f_{ij}^{Max-C}$ each having a bandwidth of respectively always equal to $\Delta_b^Y$ and $\Delta_b^C$.

the a width of bands $\Delta_b^Y$ and $\Delta_b^C$ can be different and variable, as well as determined according to the desired effects.

Using the above method, it is possible to emphasize the main colour of each $3ij$ box, whether a pure colour prevails (green, blue, red), or when white or black prevails, without ever losing any colour information.

Figure 4:
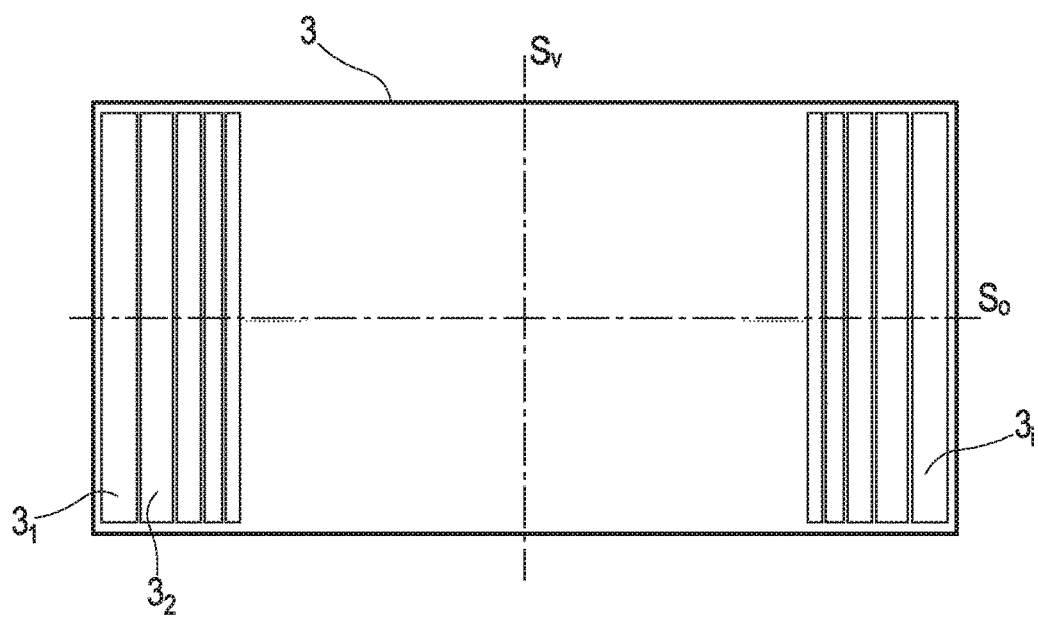
FIG. 4 shows a plurality of columns of boxes reproduced or viewed on a display screen, as seen in FIG. 1.

With particular reference to FIG. 4, in the embodiment shown, all the columns of frames $3_1, \ldots, 3_i$ associated with the frames 3 of the video signal v(t) are equal in height and differ each in width (the first ones from the centre are narrower, the others wider).

More in particular, the columns of boxes 3 all have the same height, but a width gradually decreasing for the columns of boxes 3 corresponding to the centre of the image with respect to those located toward the sides of the image. In addition, the columns of boxes 3 are of symmetrical dimensions with respect to the vertical axis S, which divides the image passing through the centre thereof.

In this case, the first column of boxes (which is the innermost column, then the narrowest one) will provide less information associated with the colour (precisely because it is narrower) than the next, but will be more punctual in reading such information (it precisely detects the predominant colour), and the detected light information will be of a greater intensity.

The columns of successive frames will progressively provide more colour information, but will be less punctual, and the luminous information detected will be less intense, up to the last column, which will provide less light intensity and saturation than all the others.

Figure 8:
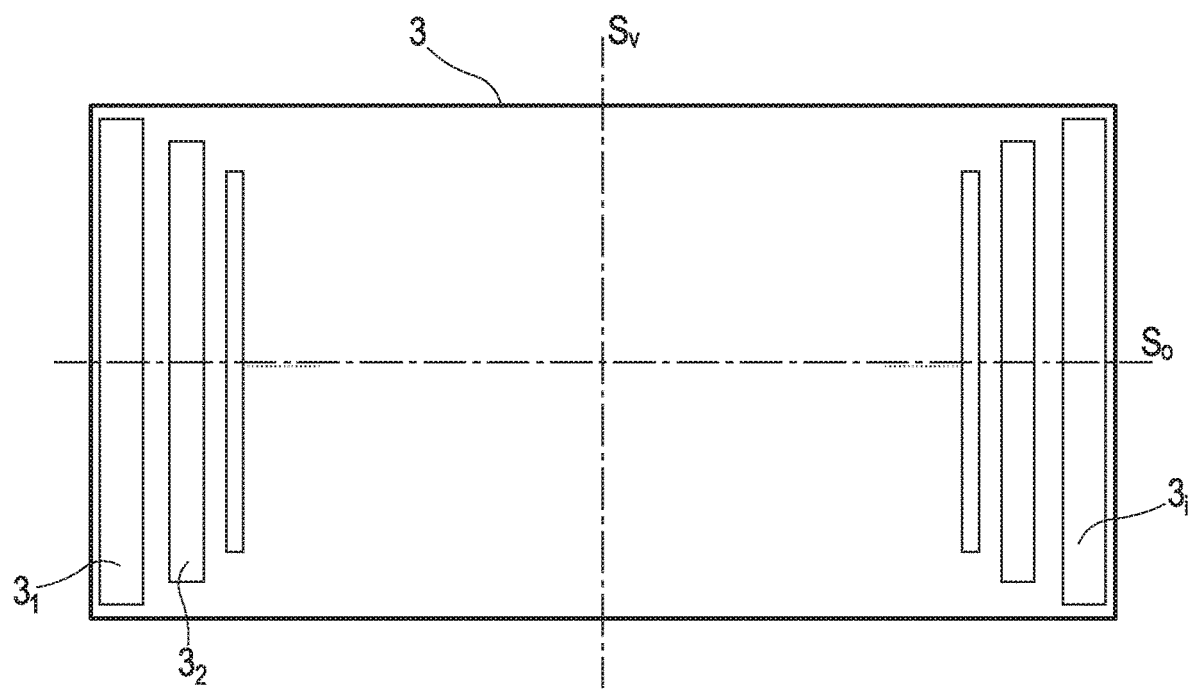
FIGS. 8, 9 and 10 show further embodiments of a plurality of columns of boxes reproduced or viewed on a display screen, as seen in FIG. 4.

With particular reference to FIG. 8, in a further embodiment, all of the columns of boxes $3_1, \ldots, 3_i$ associated with the video signal are different in terms of their height and width.

More particularly, the columns of boxes $3_i$ have a different height and different width, in which both the height and width of the columns of boxes $3_i$ are smaller for the columns of boxes $3_i$ corresponding to the centre of the image compared to those arranged towards the edges of the image, and gradually decrease. The columns of boxes 3 are of symmetrical dimensions with respect to the vertical $S_V$ and horizontal $S_O$ axes, which vertically and horizontally divide the image passing through the centre thereof.

In particular, the first column of frames of the video signal (that is, the innermost column, then the shorter and narrower one) provides the chromatic information (lower brightness intensity and lower saturation with respect to the subsequent columns) to the first lighting unit $2_i$ positioned immediately next to the scene observed by the user.

Similarly, the second column of the video signal provides the chromatic information (intensity and higher saturation of the first column) to the next lighting unit $2_i$ up to at the last column of the signal, which supplies the chromatic information to the last lighting unit $2_i$.

Figure 9:
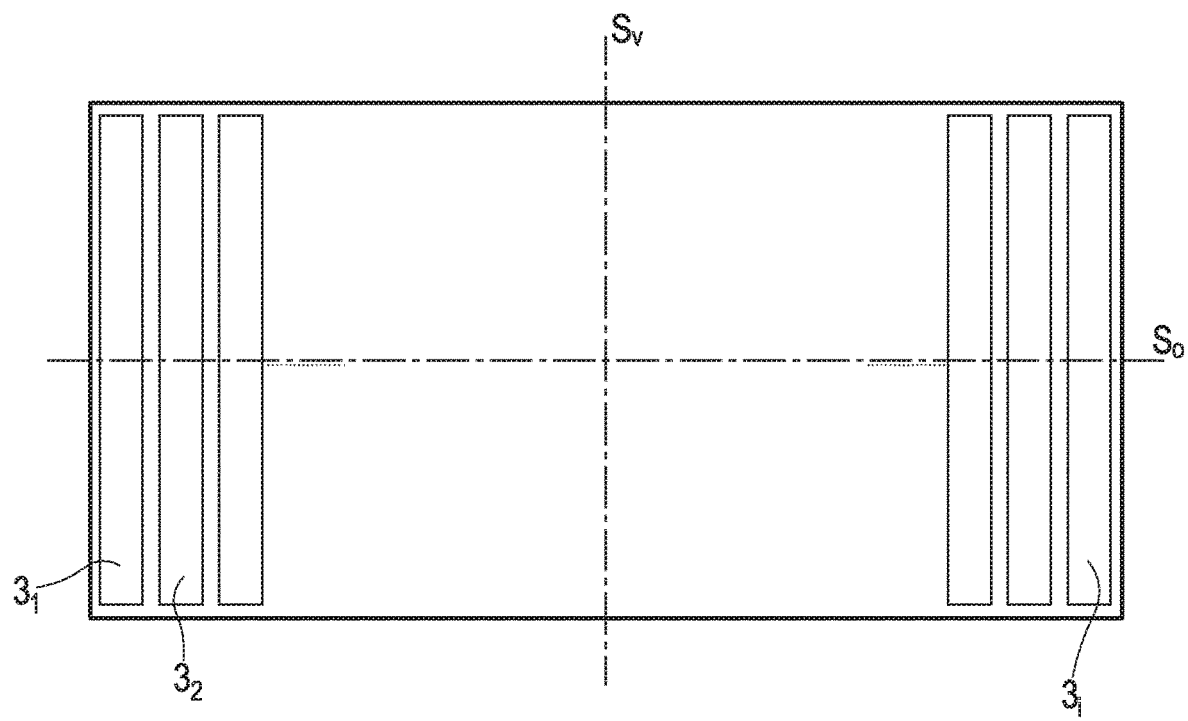

With particular reference to FIG. 9, in an additional embodiment of this invention, all of the columns of boxes $3_1, \ldots, 3_i$ associated with the video signal are the same.

Figure 10:
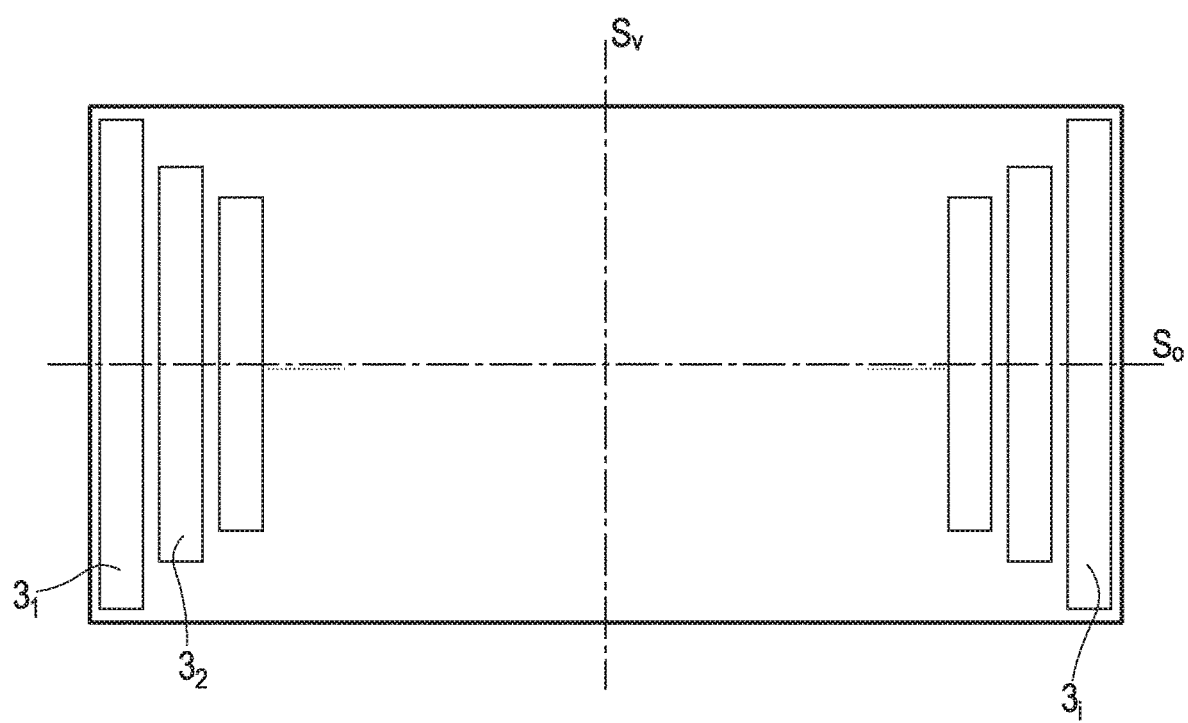

As seen in FIG. 10, in an additional embodiment of this invention, all of the columns of boxes $3_1, \ldots, 3_i$ associated with the video signal are equal in width and differ each in height.

In particular, the columns of boxes 3 all have the same width, but a height gradually decreasing for the columns of boxes 3 corresponding to the centre of the image with respect to those located toward the taller and shorter sides of the image. The columns of boxes 3 are of symmetrical dimensions with respect to the horizontal axis $S_O$, which divides the image passing through the centre thereof.

The first column of the video signal (i.e. the innermost line, the shortest one) will provide the chromatic information with respect to the columns of successive frames with the same precision, while the brightness information will be different.

The considerations made previously for the various embodiments allow the use of the lighting system, indicated overall with the reference LS, associating pairs of columns of panels with respective pairs of lighting units placed at the edges of the observed scene.

By way of example, at least 2 pairs of columns of symmetrical boxes are required with respect to an axis, for example to the vertical axis $S_V$, and the respective lighting units $2_i$ to produce the perspective effect associated with the colour, as previously described.

By way of example, the processing unit of the signal 11 receives the video signal from the acquisition unit of the signal 10, and creates three columns of boxes $3_1$, $3_2$ and $3_3$ starting from the end of the image, respectively of 15, 10 and 5 pixels.

Each column of boxes is then divided into 72 frames, and for each box $3_{ij}$ of the signal, processing unit 11 calculates the average of colours represented in its RGB combination.

The control logic unit 1 transmits the colour information relative to the column nearest the end panels of the display 3 to lighting unit 2 farthest from the end of the display 3 and so on, until the last lighting unit $2_i$ is reached.

Among other things, the central control unit 1 can drive the light sources of each lighting unit $2_i$ with specific and respective temporal delays with respect to the others in to obtain desired lighting effects, such as colour gradients and similar.

In one embodiment of this invention, the chromatic information transmitted to lighting units $2_1, \ldots, 2_i$ arranged in the immediate vicinity of the scene observed by the user will comprise the predominant colour, with the same intensity and saturation of the images associated with the scene observed by the user.

This chromatic information will be different for successive lighting units, according to a precise chromatic trend and flow, then with a specific saturation and luminous intensity, acting to create a perspective effect.

The transmission of the chromatic information associated to the $3_{ij}$ boxes, processed by logic control unit 1, towards lighting units $2_1, \ldots, 2_i$, takes place in real time with respect to the scene observed by the user.

Signal acquisition unit 10 can be an independent hardware unit, or, as in the embodiment according to FIG. 2, can be implemented by means of a suitable computer software configured to execute the code of a program to perform the signal processing method as described above.

In order to improve and make the lighting effects of the IS lighting system according to this invention particularly appreciated, it is useful to arrange lighting units $2_i$ in a suitable manner in environment A to be illuminated surrounding display 3.

Lighting units $2_1, \ldots, 2_i$ are arranged in the space adjacent to the observed scene, such as a stage and similar, in specific points so as to delimit and geometrically represent a portion of space in which the dimensions of height, length and depth are considered (delimitation and representation of a solid geometric shape). This allows the visual effect associated with the IS lighting system according to the invention to be maximised.

In particular, the space thus delimited is ideally considered as a pictorial field in which the laws of the central geometrical perspective are applied, which provide for a vanishing point (observed scene) from which vanishing lines depart, which maintain the central nature of the vanishing point (scene).

In this perspective system, the position of lighting units $2_1, \ldots, 2_i$ can be determined, which, for example, may be arranged in pairs perpendicular to the vanishing lines, which correspond to the lines divergent from the vanishing point.

Such vanishing lines have an angular opening comprised between 100°-110°, which coincides with the maximum angular opening of the right-left peripheral vision of the human eye.

In order to determine an additional position of lighting units $2_1, \ldots, 2_i$, the vanishing lines are considered to be characterised by an angular opening comprised between 60°-75°. By way of example, this angular aperture coincides with the maximum angular aperture of the upper-low peripheral vision of the human eye.

The aforementioned spatial configuration of the lighting units $2_1, \ldots, 2_i$ is functional for involving the entire peripheral vision of the user in real time.

This spatial configuration allows to exploit the potential and characteristics of peripheral vision through a chromatic perspective obtained by modulating the colour between each lighting unit and those subsequent.

Figure 13:
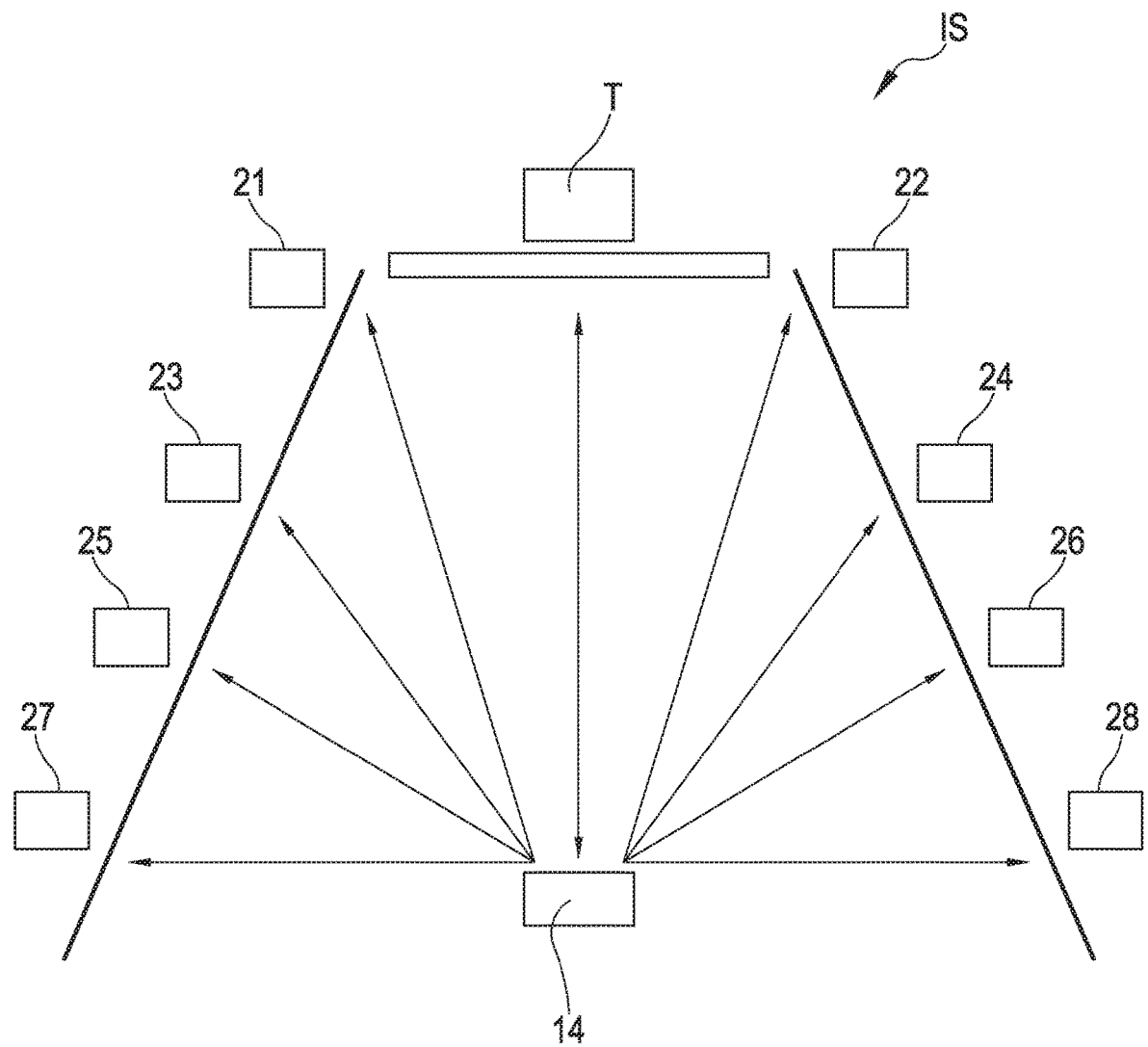
FIG. 13 shows a device for positioning the lighting units according to this invention.

Referring to FIG. 13, in an embodiment of this invention, the lighting system IS comprises a positioning device 14, such as an ultrasonic signal laser pointer, configured to allow the arrangement of the lighting units $2_1, \ldots, 2_i$ within the environment A according to a certain perspective with respect to the user's point of view, and in particular to the T-shaped display.

In particular, the positioning device 14 is controlled by a software application (such as an application to be installed on an external terminal, such as a smartphone and similar) which allows the setting of the type of T display and the number of lighting units $2_1, \ldots, 2_i$ which are to be connected to the control logic unit 1.

This software application provides a distance value between the positioning device 14 and the point observed by the user. By way of example, once the lighting units $2_1, \ldots, 2_i$ have been selected, a laser device (not shown) included in the positioning device 14 provides the direction, while an ultrasonic device (not shown in the figure) included in the same positioning device 14 provides the distance.

In addition, in one embodiment, the positioning device 14 provides for the transmission of an alarm signal. In the event of the incorrect positioning of the lighting units $2_1, \ldots, 2_i$, positioning device 14 will initiate an alarm, such as an acoustic alarm, to alert the user.

The positioning device 14 can be integrated into the control logic unit 1.

ADVANTAGES OF THE INVENTION

An advantage of this invention is that of controlling a lighting system so as to enhance the environment of any observed scene in real time, through a dynamic, continuous and immersive flow in the colour determined by the transformation of any colour video signal.

It is also an advantage of this invention to allow the involvement of the peripheral vision of the human eye, being able to take into account the response time of the human eye so as to create the vision of any observed scene in real time with a continuously moving variable chromatic perspective, determined by the transformation of any video signal in colour, increasing the visual impact of the display, allowing to give a greater centrality of the observed scene.

The solution according to this invention also has the advantage of being able to be applied to any live scene or scene observed through an optical device (camera, smartphone, tablet, etc.) with AVS output, through a scene provided by any other video signal (digital terrestrial and satellite antenna, internet etc.) or through the signal obtained from a thermal imager.

An additional advantage of this invention is that of producing an enhanced reality of the scene observed, thanks to the lateral colour flow that stimulates the peripheral vision of the user.

Another advantage of this invention is that of expanding and completing the user's visual experience with respect to any observed scene in real time. In particular, the solution proposed in this invention provides a centrality of the observed scene, which is increased (peripheral vision) and enhanced (specific use of colour) and a centrality of the display, who is immersed and involved both by this exaltation and by the arrangement of the lighting unit.

A further advantage of this invention is that of providing greater relaxation in the vision of the user as well as greater centrality to the image displayed or reproduced.

An advantage of this invention is to allow a greater depth of field as obtained through the central geometric perspective, which extends the involvement of the user with respect to the observed scene.

Lastly, the solution according to this invention pre-marks the scene under examination, enhancing it with precise spatial references, such as the central geometric perspective, providing an enrichment of the observed reality, so as to perfectly fit into the eye-scene system and thus provide a sensorial and perceptive enrichment from the point of view of the user's observation.

The present invention is described by way of example only, without limiting the scope of application, according to its preferred embodiments, but it shall be understood that the invention may be modified and/or adapted by experts in the field without thereby departing from the scope of the inventive concept, as defined in the claims herein.

What is claimed is:

1. Illumination method for lighting an environment (A) by means of a plurality of light sources ($2_{ij}$), with i=1, . . . , N, where N is a positive integer and j=1, . . . , M, where M is a positive integer:

wherein said method comprises the following steps:

A. acquiring (110) a video signal (v(t)), in which an image of each frame (3) is divided into a plurality of boxes ($3_{ij}$);

B. subdividing (120) the video signal (v(t)) into a plurality of box video signals ($v_{ij}(t)$), each associated with an image portion of each frame (3) displayed on a respective box ($3_{ij}$);

C. processing (130) frequency of said box video signals ($v_{ij}(t)$), for obtaining spectra of respective luminance ($\tilde{v}_{ij}(f)$) and chrominance signals associated with each box video signal ($v_{ij}(t)$);

D. extracting a dominant frequency band (140) of the luminance signal spectrum ($\tilde{v}_{ij}(f)$) associated with each box video signal ($v_{ij}(t)$);

E. extracting a dominant frequency band (150) of the chrominance signal spectrum ($\tilde{c}_{ij}(f)$) associated with each box video signal ($v_{ij}(t)$);

F. summing the processed spectra of the luminance and chrominance signals; and

G. obtaining a time driving signal ($p_{ij}^{Ctrl}(t)$) of each of said light sources ($2_{ij}$).

2. Method according to claim 1, characterised in that in said step B, all of the lines of each image frame are divided by each box ($3_{ij}$), so as to obtain said plurality of video signals ($v_{ij}(t)$); associated with said boxes ($3_{ij}$) of said image.

3. Method according to claim 1, characterised in that said step C comprises the following sub-steps:

C1. frequency transformation (131) of the box video signal ($v_{ij}(t)$); relative to each box ($3_{ij}$); and C2. frequency filtering (132) of the video signal box ($v_{ij}(f)$), so as to obtain the spectrum of the luminance ($\tilde{y}_{ij}(f)$) and chrominance signal ($\tilde{c}_{ij}(f)$) associated with each box ($3_{ij}$).

4. Method according to claim 1, characterised in that said step D comprises the following sub-steps:

D1. detection (141) of a maximum instantaneous frequency ($f_{ij}^{Max-Y}$) associated with a maximum value ($Y_{ij}^{Max}$) of a spectrum of each luminance signal ($\tilde{Y}_{ij}(f)$) associated with each box ($3_{ij}$); and D2. filtering (142) of the luminance signal spectrum ($\tilde{y}_{ij}(f)$)) around the maximum instantaneous frequency ($f_{ij}^{Max-Y}$), obtaining a filtered luminance spectrum ($\overline{y_{ij}^{Filt}}(f)$) associated with each box ($3_{ij}$).

5. Method according to claim 4, characterised in that in said step E2 a band-pass filtering is performed around the instantaneous maximum ($f_{ij}^{Max-Y}$) frequency for a predetermined bandwidth $\Delta_b^Y$, obtaining a spectrum of said filtered chrominance signal ($\overline{y_{ij}^{Filt}}(f)$).

6. Method according to claim 4, wherein said step E comprises the following sub-steps:

E1. detection (151) of a maximum instantaneous frequency ($f_{ij}^{Max-C}$) associated with a maximum value ($C_{ij}^{Max}$) of a spectrum of each chrominance signal ($\tilde{c}_{ij}(f)$) associated with each box ($3_{ij}$); and E2. filtering (152) of the chrominance signal spectrum ($\tilde{C}_{ij}(f)$) around the maximum instantaneous frequency ($f_{ij}^{Max-C}$), obtaining a filtered chrominance spectrum ($\overline{c_{ij}^{Filt}}(f)$) associated with each box ($3_{ij}$);

characterised in that said step F comprises the summing step (160) of said filtered spectra of the luminance ($\overline{y_{ij}^{Filt}}(f)$) and chrominance ($\overline{c_{ij}^{Filt}}(f)$) signals.

7. Method according to claim 6, characterised in that in said step G, the time driving signal ($p_{ij}^{Ctrl}(t)$) of each of said light sources ($2_{ij}$) is obtained by an inverse Fourier transform of the sum of the filtered spectra of luminance ($\overline{y_{ij}^{Filt}}(f)$) and chrominance ($\overline{c_{ij}^{Filt}}(f)$) signals.

8. The method according to claim 1, characterised in that said step E comprises the following sub-steps:

E1. detection (151) of a maximum instantaneous frequency ($f_{ij}^{Max-C}$) associated with a maximum value ($C_{ij}^{Max}$) of a spectrum of each chrominance signal ($\tilde{C}_{ij}(f)$) associated with each box ($3_{ij}$); and E2. filtering (152) of the chrominance signal spectrum ($\tilde{C}_{ij}(f)$) around the maximum instantaneous frequency ($f_{ij}^{Max-C}$), obtaining a filtered chrominance spectrum ($\overline{c_{ij}^{Filt}}(f)$) associated with each box ($3_{ij}$).

9. Method according to claim 8, characterised in that in said sub-step E2 a band-pass filtering is performed around the maximum instantaneous frequency ($f_{ij}^{Max-C}$) for a predetermined bandwidth ($\Delta_b^C$), obtaining a spectrum of said filtered chrominance signal ($\widetilde{c_{ij}^{filt}}$ (f)).

10. Method according to claim 1, characterised in that said video signal (v(t)) is of the type intended to be represented on a display (T).

11. Method according to claim 1, characterised in that said plurality of light sources ($2_{ij}$) are installed in a plurality of lighting units ($2_i$), with i=1, ..., N, where N is a positive integer, wherein said lighting units ($2_1$, ..., $2_i$) are arranged in a plurality of environment (A).

12. Method according to claim 11, characterised in that each lighting unit ($2_i$) comprises a subset of one or more light sources ($2_{ij}$).

13. Method according to claim 12, characterised in that said light sources ($2_{ij}$) of said subset of one or more light sources ($2_{ij}$) of each lighting unit ($2_i$) each correspond to a respective subset of boxes ($3_{ij}$) of said image of each frame, such that each of said boxes ($3_{ij}$) of the subset of boxes ($3_{ij}$) is adjacent to at least one other panel ($3_{ij}$) of the same subset.

14. Method according to claim 12, characterised
in that said sub-set of boxes is a column of boxes ($3_i$), in which said boxes are arranged vertically, and
in that the subset of the light sources ($2_{ij}$) of each lighting unit ($2_i$) is arranged vertically.

15. Method according to claim 11, characterised in that light sources ($2_{ij}$) of each lighting unit ($2_i$) are driven with respective time delays with respect to the others.

16. Method according to claim 1, characterised in that columns of boxes ($3_i$) are shaped according to one of the following configurations:
said columns of boxes ($3_i$) are all the same;
said columns of boxes ($3_i$) all have the same height, but a gradually decreasing width for the columns of boxes ($3_i$) corresponding to the centre of the image with respect to those arranged towards the sides of the image, said columns of boxes ($3_i$) being of symmetrical dimensions with respect to the vertical axis ($S_v$) which divides said image passing through the centre thereof;
said columns of boxes ($3_i$) have a different height and a different width, in which both the height and the width of the columns of boxes ($3_i$) gradually decrease for the columns of boxes ($3_i$) corresponding in the centre of the image with respect to those arranged towards the edges of the image, said columns of boxes ($3_i$) being of symmetrical dimensions with respect to the vertical ($S_V$) and horizontal ($S_O$) axes which vertically and horizontally divide said image passing for the centre of the same; or
said columns of boxes ($3_i$) all have the same width, but a decreasing height for the columns of boxes ($3_i$) corresponding to the centre of the image with respect to those arranged towards the taller and shorter sides of the image, said columns of boxes ($3_i$) being of symmetrical dimensions with respect to the horizontal axis ($S_O$) which divides said image passing through the centre thereof.

17. Method according to claim 1, wherein the environment (A) has walls, characterised in that said light sources ($2_{ij}$) are arranged facing the walls of said environment (A).

18. A non-transitory computer-readable storage medium comprising instructions which, when executed by a processor, cause the processor to perform an illumination operation for lighting an environment (A) by means of a plurality of light sources ($2_{ij}$), with i=1, ..., N, where N is a positive integer and j=1, ..., M, where M is a positive integer, wherein said operation comprises the following steps:

A. acquiring (110) a video signal (v(t)), in which an image of each frame (3) is divided into a plurality of boxes ($3_{ij}$);
B. subdividing (120) the video signal (v(t)) into a plurality of box video signals ($v_{ij}$(t)), each associated with an image portion of each frame (3) displayed on a respective box ($3_{ij}$);
C. processing (130) frequency of said box video signals ($v_{ij}$(t)), for obtaining spectra of respective luminance ($\tilde{y}_{ij}^{(f)}$) and chrominance signals ($\tilde{c}_{ij}^{(f)}$) associated with each box video signal ($v_{ij}$(t));
D. extracting a dominant frequency band (140) of the luminance signal spectrum ($\tilde{y}_{ij}$ (f)) associated with each box video signal ($v_{ij}$(t));
E. extracting a dominant frequency band (150) of the chrominance signal spectrum ($\tilde{c}_{ij}$ (f)) associated with each box video signal ($v_{ij}$(t));
F. summing the processed spectra of the luminance and chrominance signals; and
G. obtaining a time driving signal ($p_{ij}^{Ctrl}$(t)) of each of said light sources ($2_{ij}$).

19. Lighting system (IS) to light environment (A), based on a video signal (v(t)) comprising
a plurality of lighting units ($2_i$), with i=1, ..., N, where N is a positive integer, wherein the lighting units ($2_i$) are arranged in the environment (A),
wherein each of said lighting units ($2_1$, ..., $2_i$) comprises a plurality of light sources ($2_{ij}$), where j=1, ..., M, with M a positive integer, and
a control logic unit (1), to which the video signal source (T) can be connected for the acquisition of said video signal (v(t)),
wherein said control logic unit (1) is operatively connected to said lighting units ($2_i$), such that said control logic unit (1) can independently drive each of said light sources ($2_{ij}$), and
wherein said control logic unit (1) is configured to perform an illumination method for lighting the environment (A) by means of the plurality of light sources ($2_{ij}$), wherein said method comprises the following steps:
A. acquiring (110) the video signal (v(t)), in which an image of each frame (3) is divided into a plurality of boxes ($3_{ij}$);
B. subdividing (120) the video signal (v(t)) into a plurality of box video signals ($v_{ij}$(t)), each associated with an image portion of each frame (3) displayed on a respective box ($3_{ij}$);
C. processing (130) frequency of said box video signals ($v_{ij}$(t)), for obtaining spectra of respective luminance $\tilde{y}_{ij}$(f) and chrominance signals ($\tilde{c}_{ij}$ (f)) associated with each box video signal $v_{ij}$(t));
D. extracting a dominant frequency band (140) of the luminance signal spectrum $\tilde{y}_{ij}$(f) associated with each box video signal ($v_{ij}$(t));
E. extracting a dominant frequency band (150) of the chrominance signal spectrum ($\tilde{c}_{ij}$ (f)) associated with each box video signal ($v_{ij}$(t));
F. summing the processed spectra of the luminance and chrominance signals; and
G. obtaining a time driving signal ($p_{ij}^{Ctrl}$(t)) of each of said light sources ($2_{ij}$).

20. System (IS) according to claim 19, characterised in that said control logic unit (1) comprises
a signal acquisition unit (10) for acquiring the video signal (v(t)), a signal processing unit (11) for processing the video signal (v(t)) acquired, so as to obtain the time driving signals ($p_{ij}^{Ctrl}(t)$) of each of said light sources (2$_{ij}$), and a plurality of driving units (12$_i$), with i=1, ..., N, each configured to drive the light sources (2$_{ij}$) of a respective lighting unit (2$_i$) associated with it, on the basis of said driving signals of each light source (2$_{ij}$).

21. System according to claim 19, characterised by the fact that said light sources (2$_{ij}$) comprise multicolour LEDs.

22. System according to claim 19, characterised in that said control logic unit (1) is connected to the lighting unit (2) by means of wires and/or wirelessly, such as by means of Bluetooth®, infrared and similar.

23. System according to claim 19, characterised in that it comprises a positioning device (14), such as an ultrasonic signal laser pointer, configured to allow the arrangement of said lighting units (2) within the environment (A) according to a predefined perspective with respect both to the point of view of a user and with respect to said video signal source (T).

* * * * *